(12) United States Patent
Ezumi et al.

(10) Patent No.: US 10,612,474 B2
(45) Date of Patent: Apr. 7, 2020

(54) CONTROLLER FOR MULTI-CYLINDER ENGINE

(71) Applicant: MAZDA MOTOR CORPORATION, Hiroshima (JP)

(72) Inventors: Keitaro Ezumi, Hiroshima (JP); Kazuhiro Takemoto, Hiroshima (JP); Tomokuni Kusunoki, Hiroshima (JP); Atsushi Inoue, Hiroshima (JP); Akitomo Takagi, Hiroshima (JP); Masanari Sueoka, Hiroshima (JP); Masami Nishida, Hiroshima (JP); Kazufumi Kumakura, Hiroshima (JP); Kota Matsumoto, Hiroshima (JP); Tomohiro Hasegawa, Hiroshima (JP); Tadasu Hashiguchi, Hiroshima (JP); Toshiaki Takahashi, Hiroshima (JP); Masatoshi Hidaka, Higashi-hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/086,520

(22) PCT Filed: Mar. 29, 2017

(86) PCT No.: PCT/JP2017/012930
§ 371 (c)(1),
(2) Date: Sep. 19, 2018

(87) PCT Pub. No.: WO2017/170708
PCT Pub. Date: Oct. 5, 2017

(65) Prior Publication Data
US 2019/0101064 A1 Apr. 4, 2019

(30) Foreign Application Priority Data

Mar. 31, 2016 (JP) .................................. 2016-070643
Mar. 31, 2016 (JP) .................................. 2016-070644

(51) Int. Cl.
*F01L 1/34* (2006.01)
*F02D 13/02* (2006.01)
(Continued)

(52) U.S. Cl.
CPC ........ *F02D 13/0207* (2013.01); *F01L 1/3442* (2013.01); *F01L 9/025* (2013.01);
(Continued)

(58) Field of Classification Search
CPC ..... F01L 1/3442; F01L 9/025; F02D 13/0207; F02D 13/06
(Continued)

(56) References Cited

U.S. PATENT DOCUMENTS

| 4,499,870 A | 2/1985 | Aoyama |
| 6,431,154 B1 | 8/2002 | Inoue |

(Continued)

FOREIGN PATENT DOCUMENTS

| EP | 2 960 470 A1 | 12/2015 |
| JP | H02-135603 U | 11/1990 |

(Continued)

OTHER PUBLICATIONS

International Search Report issued in PCT/JP2017/012930; dated May 23, 2017.
(Continued)

*Primary Examiner* — Ching Chang
(74) *Attorney, Agent, or Firm* — Studebaker & Brackett PC

(57) ABSTRACT

Disclosed is a control device for a multi-cylinder engine having a combustion chamber (19) to which an intake port
(Continued)

(16) and an exhaust port (17) are connected. The control device comprises: an intake-side variable valve operating mechanism (71) for controlling a lift timing of two intake valves (21a, 21b) of the intake port (16); an exhaust-side variable valve operating mechanism (72) for controlling a lift timing of an exhaust valve (22a); and an exhaust-side valve operating mechanism (73) for driving an exhaust valve (22b) at a fixed timing. The control device is operable, when executing cylinder deactivation in a low engine load and low engine speed operating range, to cause the exhaust-side variable valve operating mechanism (72) to open the exhaust valve (22a) during downward movement of a piston (14) in a cylinder (18) being subjected to the cylinder deactivation.

6 Claims, 5 Drawing Sheets

(51) Int. Cl.
| | | |
|---|---|---|
| *F02D 13/06* | (2006.01) | |
| *F02D 41/00* | (2006.01) | |
| *F01L 1/344* | (2006.01) | |
| *F01L 9/02* | (2006.01) | |

(52) U.S. Cl.
CPC ......... *F02D 13/0257* (2013.01); *F02D 13/06* (2013.01); *F02D 41/0002* (2013.01); *F02D 41/0087* (2013.01); *F01L 2001/34446* (2013.01); *F02D 2041/0012* (2013.01); *F02D 2200/101* (2013.01); *Y02T 10/18* (2013.01)

(58) Field of Classification Search
USPC ................................ 123/90.15, 90.16, 90.17
See application file for complete search history.

(56) References Cited

U.S. PATENT DOCUMENTS

| | | | | |
|---|---|---|---|---|
| 7,143,728 | B1 * | 12/2006 | Yasui ........................ | F01L 1/34 123/90.15 |
| 2009/0120389 | A1 | 5/2009 | Rauch et al. | |
| 2015/0203118 | A1 | 7/2015 | Mitsuyasu | |

FOREIGN PATENT DOCUMENTS

| | | |
|---|---|---|
| JP | 2006-144634 A | 6/2006 |
| JP | 2006-336579 A | 12/2006 |
| JP | 4059131 B2 | 3/2008 |
| JP | 2009-121481 A | 6/2009 |
| JP | 2015-169190 A | 9/2015 |
| WO | 2016/038255 A1 | 3/2016 |

OTHER PUBLICATIONS

Office Action corresponding to Japanese Patent Application No. 2016-070643; mailed by the Japanese Patent Office dated Dec. 25, 2017.
The extended European search report issued by the European Patent Office dated Feb. 21, 2019, which corresponds to European Patent Application No. 17775242.5-1007 and is related to U.S. Appl. No. 16/086,520.
International Preliminary Report on Patentability and Written Opinion issued in PCT/JP2017/012930; dated Oct. 2, 2018.

* cited by examiner

CONTROLLER FOR MULTI-CYLINDER ENGINE

TECHNICAL FIELD

The present invention relates to an engine control device, and more particularly to an engine control device for controlling opening and closing of an intake valve by a hydraulic variable valve operating mechanism.

BACKGROUND ART

In the technical field of engine control devices, there has heretofore been known a technique of adequately controlling valve opening and closing timings of each of an intake valve and an exhaust valve of an engine to thereby enhance engine operation efficiency, particularly, in a compression self-ignition combustion operating range. Further, as a means to control opening and closing of each of an intake valve and an exhaust valve of an engine, there have been known a so-called mechanical valve operating mechanism configured to open and close such an engine valve at constant intervals and in a constant lift amount, according to the shape of a cam nose provided on the surface of a cam, and a hydraulic variable valve operating mechanism configured to control a lift start timing and a lift amount, using oil pressure, without fully depending on the shape of the cam nose (e.g., the following Patent Document 1).

CITATION LIST

Patent Document

Patent Document 1: Japanese Patent Laid-Open No. 2009-121481

A variable valve operating mechanism described in the Patent Document 1 comprises: a cam configured to be rotated in synchronization with rotation of a crankshaft; a pressure chamber internally filled with engine oil and configured such that the pressure of the engine oil is changed according to movement of the cam; and a hydraulic valve disposed in a hydraulic circuit connected to the pressure chamber and configured to selectively open and close the hydraulic circuit to control a hydraulic pressure to be applied to an engine valve. In this variable valve operating mechanism, the lift start timing and the lift amount during opening and closing of the engine valve can be controlled by the hydraulic valve, without fully depending on a cam profile. Further, by applying this variable valve operating mechanism to a multi-cylinder engine, it becomes possible to independently control each of a plurality of intake valves and a plurality of exhaust valves provided, respectively, in a plurality of intake ports and a plurality of exhaust ports connecting to each of a plurality of combustion chambers of the multi-cylinder engine.

On the other hand, in the case of using the hydraulic variable valve operating mechanism, there is a problem that it is unable to sufficiently raise the oil pressure in the variable valve operating mechanism just after the start of an engine starting operation. That is, during cranking just after the start of the engine starting operation, each piston of the engine is passively moved by a driving force of a starter, and, in this process, if the exhaust valves are not opened at least when the combustion chamber is expanded during downward movement of the piston, the internal pressure of the combustion chamber is reduced, resulting in generation of a resistance against the downward movement of the piston. Therefore, in the case where the hydraulic variable valve operating mechanism is applied to a multi-cylinder engine having a plurality of exhaust valves and a plurality of intake valves in each cylinder, an exhaust valve operating mechanism configured to provide a fixed valve timing and a fixed lift amount is applied to at least one of the exhaust valve.

SUMMARY OF INVENTION

Technical Problem

Meanwhile, in recent years, with a view to reduction in pumping loss, improvement in fuel economy and reduction in exhaust gas emission amount, in an engine, a technique of deactivating some of a plurality of cylinders of a multi-cylinder engine in a given operating range, so-called "cylinder deactivation", has been implemented.

For example, when implementing cylinder deactivation control in an engine having an intake port and an exhaust port, wherein a variable valve operating mechanism is applied to each of two intake valves provided in the intake port, and one of two exhaust valves provided in the exhaust port, and an exhaust valve operating mechanism configured to provide a fixed valve timing and a fixed lift amount is applied to the remaining one of the exhaust valves provided in the exhaust port, the control is executed as follows. During the cylinder deactivation, in each of one or more deactivated cylinders, fuel injection is not performed, and the variable valve operating mechanisms are not activated, whereas the piston and the exhaust valve operating mechanism operate in the same manner as that during normal cylinder activation. The exhaust valve operating mechanism is configured to provide a fixed lift timing, so that the exhaust valve to which the exhaust valve operating mechanism is applied is opened only during upward movement of the piston, and closed during downward movement of the piston. Further, the variable valve operating mechanisms are deactivated during the cylinder deactivation, as mentioned above, so that the intake valves and the exhaust valve to which the variable valve operating mechanisms are applied are closed during the upward movement and the downward movement of the piston. Therefore, during the cylinder deactivation, all of the intake valves and the exhaust valves are closed during the downward movement of the piston, so that, when the combustion chamber is expanded along with the downward movement of the piston, the internal pressure of the combustion chamber is rapidly reduced, resulting in generation of a resistance against the downward movement of the piston. Thus, there is a problem that this resistance becomes a resistance against the remaining activated cylinders, and thereby a pumping loss undesirably occurs in the engine. This problem can occur not only in the variable valve operating mechanism described in the above Patent Document 1 but also in various other types of variable valve operating mechanisms configured to control an engine valve using oil pressure, such as a VVL (Variable Valve Lift) mechanism and a VVT (Variable Valve Timing) mechanism.

The present invention has been made in view of solving the above problem, and an object thereof is to provide an engine control device capable of suppressing a pumping loss during cylinder deactivation in a specific engine.

Solution to Technical Problem

In order to solve the above problem, the present invention provides a control device for a multi-cylinder engine, including: a plurality of intake ports; a plurality of intake valves each provided correspondingly to a respective one of the plurality of intake ports; a plurality of exhaust ports; a plurality of exhaust valves each provided correspondingly to a respective one of the plurality of exhaust ports; a combustion chamber to which the plurality of intake ports and the plurality of exhaust ports are connected; an intake-side variable valve operating mechanism operable to adjust a lift timing of each of the plurality of intake valves provided, respectively, in the plurality of intake ports; an exhaust-side variable valve operating mechanism operable to adjust a lift timing of at least one of the plurality of the exhaust valves provided, respectively, in the plurality of exhaust ports; and an exhaust-side valve operating mechanism operable to drive, at a fixed timing, the remaining one or more of the plurality of the exhaust valves provided, respectively, in the plurality of exhaust ports, wherein, when a cylinder deactivation of at least one specific cylinder in the multi-cylinder engine is executed in a given operating range, the control device is operable to stop a fuel injection in the said cylinder, and to prohibit a lift of the intake valve in the said cylinder by controlling the intake-side variable valve operating mechanism, and to open the exhaust valve in the said cylinder by controlling the exhaust-side variable valve operating mechanism, during a downward movement of a piston in the said cylinder.

The control device of the present invention having the above feature is operable, in the course of the execution of the cylinder deactivation in the given operating range, to cause the exhaust-side variable valve operating mechanism to open at least one of the exhaust valves during the downward movement of the piston, in the specific cylinder. Thus, even in a situation where all of the intake valves and the one or more exhaust valves being driven by the exhaust-side valve operating mechanism are closed during the downward movement of the piston in the specific cylinder, at least one of the exhaust valves in the specific cylinder can be opened to communicate the combustion chamber with the exhaust port on a downstream side of the engine. Therefore, by communicating the combustion chamber with the exhaust port during the downward movement of the piston, it becomes possible to suppress reduction in internal pressure of the combustion chamber during the downward movement of the piston. This makes it possible to suppress a pumping loss during the cylinder deactivation.

Preferably, in the control device of the present invention, even when the cylinder deactivation of the at least one specific cylinder is executed, the control device is operable, in a given low engine speed range, to maintain a closed state of the exhaust valve in the said cylinder during a downward movement of a piston in the said cylinder.

According to this feature, in the low engine speed range in which the pumping loss becomes relatively small, the closed state of the exhaust valves is maintained to enable warm air in the combustion chamber to stay in the combustion chamber without being discharged from the combustion chamber. This makes it possible to maintain the internal temperature of the combustion chamber in an operating range having a relatively low pumping loss.

Preferably, in the control device of the present invention, a lift amount of the exhaust valve during the cylinder deactivation is gradually increased along with an increase in an engine speed. Preferably, in the control device of the present invention, a lift amount of the exhaust valve during the cylinder deactivation is gradually reduced along with a decrease in an engine speed.

Generally, the pumping less gradually increases along with an increase in engine speed. However, according to the above feature, the lift amount of the exhaust valve is gradually increased along with an increase in engine speed, so that it becomes possible to introduce a large volume of gas from the opened exhaust valve into the combustion chamber. This makes it possible to suppress an increase in pumping loss even in a situation where the engine speed is increased.

Preferably, in the control device of the present invention, the multi-cylinder engine has a plurality of cylinders arranged in series, and wherein the cylinder deactivation is executed for at least one cylinder located close to a middle of the plurality of cylinders arranged in series.

Effect of Invention

As above, the present invention makes it possible to suppress the pumping loss during the cylinder deactivation in a specific engine.

DESCRIPTION OF EMBODIMENTS

With reference to the accompanying drawings, an engine system according to one embodiment of the present invention will now be described.

Figure 1:
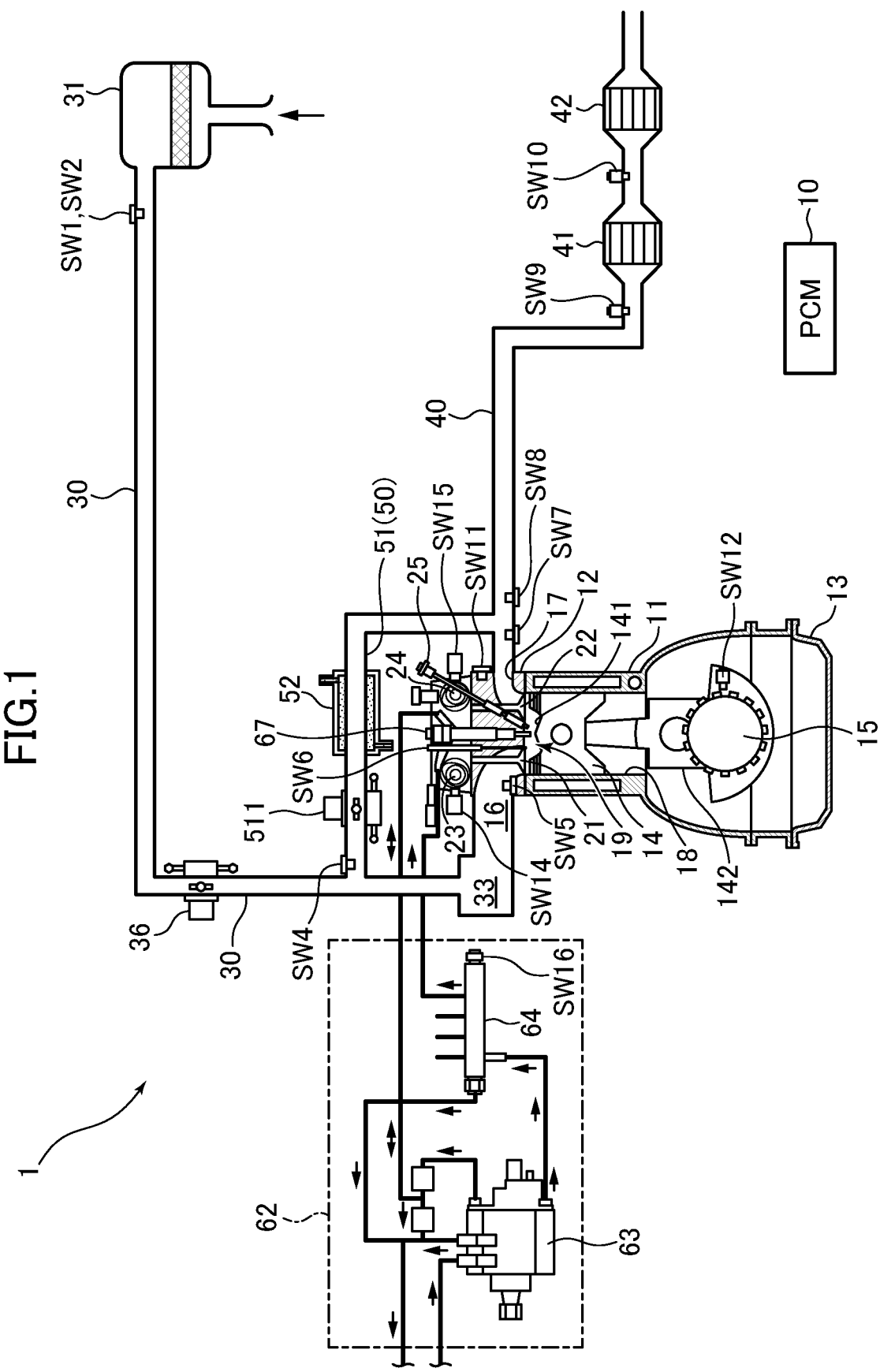
FIG. 1 is a schematic diagram of an engine system according to one embodiment of the present invention.
Figure 2:
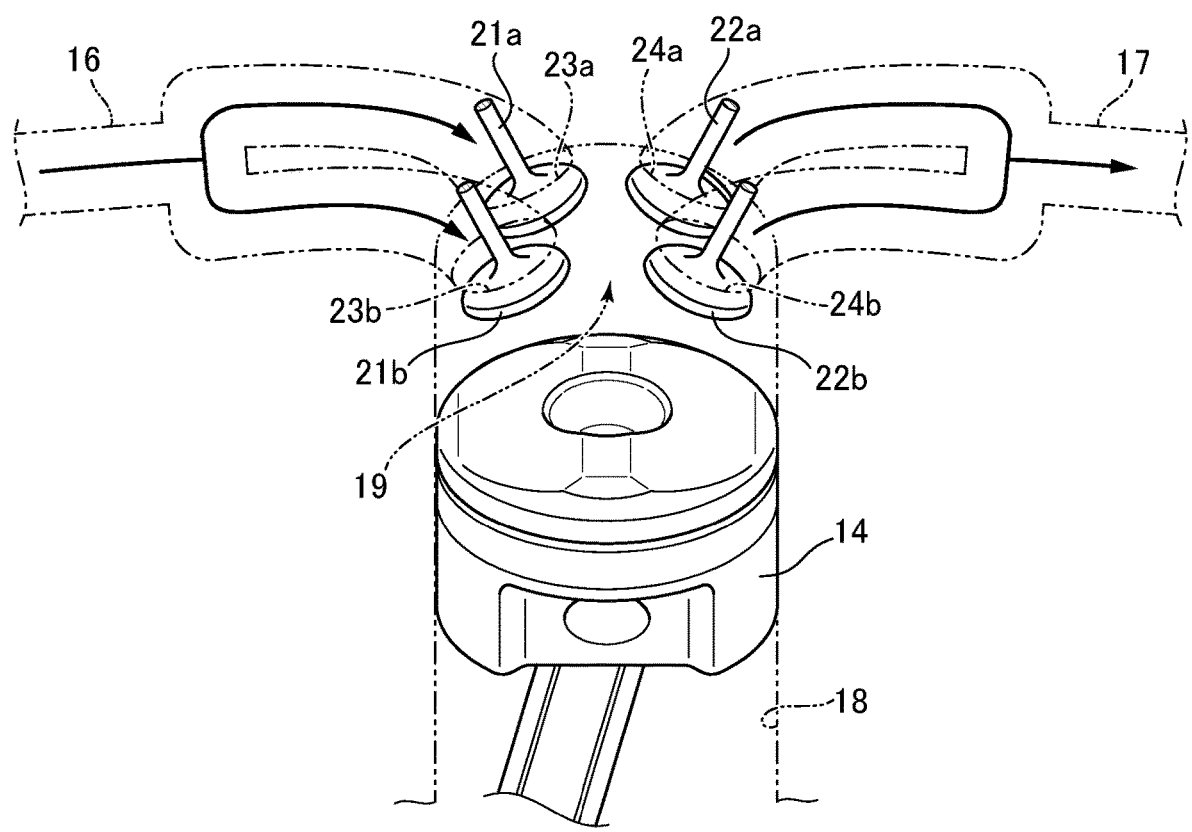
FIG. 2 is a schematic configuration diagram of an engine in the engine system according to this embodiment.

First of all, with reference to FIGS. 1 and 2, the configuration of the engine system according to this embodiment will be described. FIGS. 1 and 2 are schematic diagrams of the engine system according to this embodiment. In particular, FIG. 2 is a schematic configuration diagram depicting the vicinity of an intake port and an exhaust port of an engine in the engine system according to this embodiment.

As depicted in FIG. 1, the engine 1 is a gasoline engine which is mounted to a vehicle, and configured to be supplied with fuel containing at least gasoline. The engine 1 comprises: a cylinder block 11 provided with a plurality of cylinders 18 (although FIG. 1 depicts only one cylinder, the cylinder block 11 is actually provided with a plurality of, e.g., four, cylinders, in an in-line arrangement); a cylinder head 12 disposed on the top of the cylinder block 11; and an oil pan 13 disposed under the cylinder block 11 and storing engine oil therein. Each of the cylinders 18 is internally provided with a piston 14 which is connected to a crankshaft 15 via a connecting rod 142, and fittingly inserted in the cylinder 18 in a reciprocatingly movable manner. The piston 14 has a top surface provided with a cavity 141 forming a re-entrant type combustion chamber usable as a combustion chamber of a diesel engine. The cavity 141 is configured to be opposed to an aftermentioned injector 67 when the piston 14 is located around a top dead center position on a compression stroke. The cylinder head 12, the cylinder 18, and the piston 14 having the cavity 141 define a combustion chamber 19. Here, it is to be noted that the shape of the combustion chamber 19 is not limited to the depicted shape. For example, the shape of the cavity 141, the shape of the top surface of the piston 14, the shape of a ceiling surface of the combustion chamber 19 and the like may be appropriately changed.

With a view to improvement in theoretical thermal efficiency, stabilization of aftermentioned compression ignition combustion, and others, the engine 1 is configured to have a relatively high geometrical compression ratio of 15 or more. Here, it is to be noted that the geometrical compression ratio may be appropriately set in the range of about 15 to 20.

With respect to each of the cylinders 18, the cylinder head 12 is formed with an intake port 16 and an exhaust port 17 each communicated with the combustion chamber 19. The intake port 16 and the exhaust port 17 are provided, respectively, with an intake valve 21 and an exhaust valve 22 for opening and closing respective openings of the intake and exhaust ports on the side of the combustion chamber 19.

With respect to each of the cylinders 18, the cylinder head 12 is provided with an injector 67 for injecting fuel directly into the cylinder 18 (direct injector). The injector 67 is disposed such that a nozzle hole thereof faces the inside of the combustion chamber 19, from a central region of the ceiling surface of the combustion chamber 19. The injector 67 is operable to inject fuel directly into the combustion chamber 19, at an injection timing set according to an operating state of the engine 1 and in an amount according to the operating state of the engine 1. In this example, the injector 67 is a multi-hole injector having a plurality of nozzle holes, although its detailed depiction will be omitted. Thus, the injector 67 is operable to inject fuel such that fuel mist spreads in a radial pattern from a central position of the combustion chamber 19. Fuel mist injected so as to spread in a radial pattern from the central position of the combustion chamber 19, at a timing when the piston 14 is located around a top dead center position on a compression stroke, flows along a wall surface of the cavity 141 formed in the top surface of the piston. In other words, the cavity 141 is formed such that it can receive therein fuel mist injected at a timing when the piston 14 is located around a top dead center position on a compression stroke. A combination of this multi-hole injector 67 and the cavity 141 is advantageous in shortening an air-fuel mixture formation period after injection of fuel, and shortening a combustion period. Here, it is to be noted that the injector 67 is not limited to the multi-hole injector, but may be an outwardly lifting valve injector.

A non-depicted fuel tank and the injector 67 are coupled together by a fuel supply line extending therebetween. In the fuel supply line, a fuel supply system 62 is inserted which comprises a fuel pump 63 and a common rail 64 and is capable of supplying fuel to the injector 67 at a relatively high fuel pressure. The fuel pump 63 is capable of pumping fuel from the fuel tank to the common rail 64, and the common rail 64 is capable of storing the pumped fuel at a relatively high fuel pressure. In response to opening of the injector 67, fuel stored in the common rail 64 is injected from the nozzle holes of the injector 67. Here, the fuel pump 63 is a plunger pump, which is configured to be driven by the engine 1, although depiction is omitted. The fuel supply system 62 comprising the engine-driven pump enables fuel having a high fuel pressure of 30 MPa or more to be supplied to the injector 67. The fuel pressure may be set to about 120 MPa at a maximum. The pressure of fuel to be supplied to the injector 67 is changed according to the operating state of the engine 1. Here, it is to be noted that the fuel supply system 62 is not limited to this configuration.

The cylinder head 12 is further provided with a spark plug 25 for forcibly igniting (specifically, spark-igniting) an air-fuel mixture in the combustion chamber 19. In this example, the spark plug 25 is disposed to penetrate through the cylinder head 12 while extending obliquely downwardly from an exhaust side of the engine 1. Further, the spark plug 25 is disposed such that a distal end thereof faces the inside of the cavity 141 of the piston 14 when the piston 14 is located at a top dead center position on a compression stroke.

With respect to each of the cylinders 18, an intake passage 30 is connected to one of opposite lateral surfaces of the cylinder head 12 of the engine 1, in such a manner as to be communicated with the intake port 16. On the other hand, an exhaust passage 40 for discharging burned or combusted gas (exhaust gas) from the combustion chamber 19 is connected to the other lateral surface of the cylinder head 12 of the engine 1.

The intake passage 30 is provided with an air cleaner 31 for filtering intake air, at an upstream end thereof, and a throttle valve 36 for adjusting the amount of intake air to each of the cylinders 18, on a downstream side of the air cleaner 31. The intake passage 30 is further provided with a surge tank 33, at a position adjacent to a downstream end of the intake passage 30. A part of the intake passage 30 located downstream of the surge tank 33 is formed as a plurality of independent passages each branched with respect to a respective one of the cylinders 18. Each of the independent passages has a downstream end connected to a respective one of the intake ports 16 in the cylinders 18.

An upstream part of the exhaust passage 40 is formed as an exhaust manifold which comprises: a plurality of independent passages each branched with respect to a respective one of the cylinders 18 and each connected to an outer end of a respective one of the exhaust ports 17; and a collector portion in which the independent passages are collected together. At positions downstream of the exhaust manifold, the exhaust passage 40 is provided with a direct catalyst 41 and an underfoot catalyst 42 each serving as an exhaust gas purification device for purifying harmful components contained in exhaust gas. Each of the direct catalyst 41 and the underfoot catalyst 42 comprises a tubular casing, and a catalyst, such as three-way catalyst, disposed in a flow path inside the casing.

A region of the intake passage 30 located between the surge tank 33 and the throttle valve 36 and a region of the exhaust passage 40 located upstream of the direct catalyst 41 are connected to each other via an EGR passage 50 for recirculating part of exhaust gas to the intake passage 30. The EGR passage 50 comprises a main passage 51 provided with an EGR cooler 52 for cooling exhaust gas by engine cooling water. The main passage 51 is further provided with an EGR valve 511 for adjusting a recirculation amount of exhaust gas to the intake passage 30.

The engine 1 is configured to be controlled by a powertrain control module (hereinafter referred to as "PCM") 10 as a control means. The PCM 10 is composed of a microprocessor comprising a CPU, a memory, a counter timer group, an interface, and paths connecting these units. This PCM 10 forms a controller.

As depicted in FIG. 2, each of the cylinders 18 is connected to the intake port 16 and the exhaust port 17. More specifically, the intake port 16 is communicated with the combustion chamber 19 through two intake openings 23a, 23b, and the exhaust port 17 is communicated with the combustion chamber 19 through two exhaust openings 24a, 24b. Further, the intake openings 23a, 23b are configured to be opened and closed, respectively, by two intake valves 21a, 21b configured to be controlled independently of each other, and the exhaust openings 24a, 24b are configured to be opened and closed, respectively, by two exhaust valves 22a, 22b configured to be controlled independently of each other.

In this embodiment, each of the intake valves 21a, 21b is configured to be controlled by a VVT mechanism, a VVL mechanism, or a variable valve operating mechanism as described in the Patent Document 1. Further, one of the exhaust valves 22a, 22b, e.g., the exhaust valve 22a, is configured to be controlled by a VVT mechanism, a VVL mechanism, or a variable valve operating mechanism as described in the Patent Document 1, and the other exhaust valve 22b is configured to be driven by an exhaust-side valve operating mechanism for performing an opening and closing action according to a cam profile so as to provide a fixed lift amount and a fixed lift timing.

In this way, one 22a of the two exhaust valves 22a, 22b is controlled by the variable valve operating mechanism, and the other exhaust valve 22b is driven by the exhaust-side valve operating mechanism, so that it becomes possible to drive at least the exhaust valve 22b, irrespective of a rise in pressure of the engine oil, for example, when performing cranking for engine starting, to reduce the pumping less during the cranking.

Figure 3:
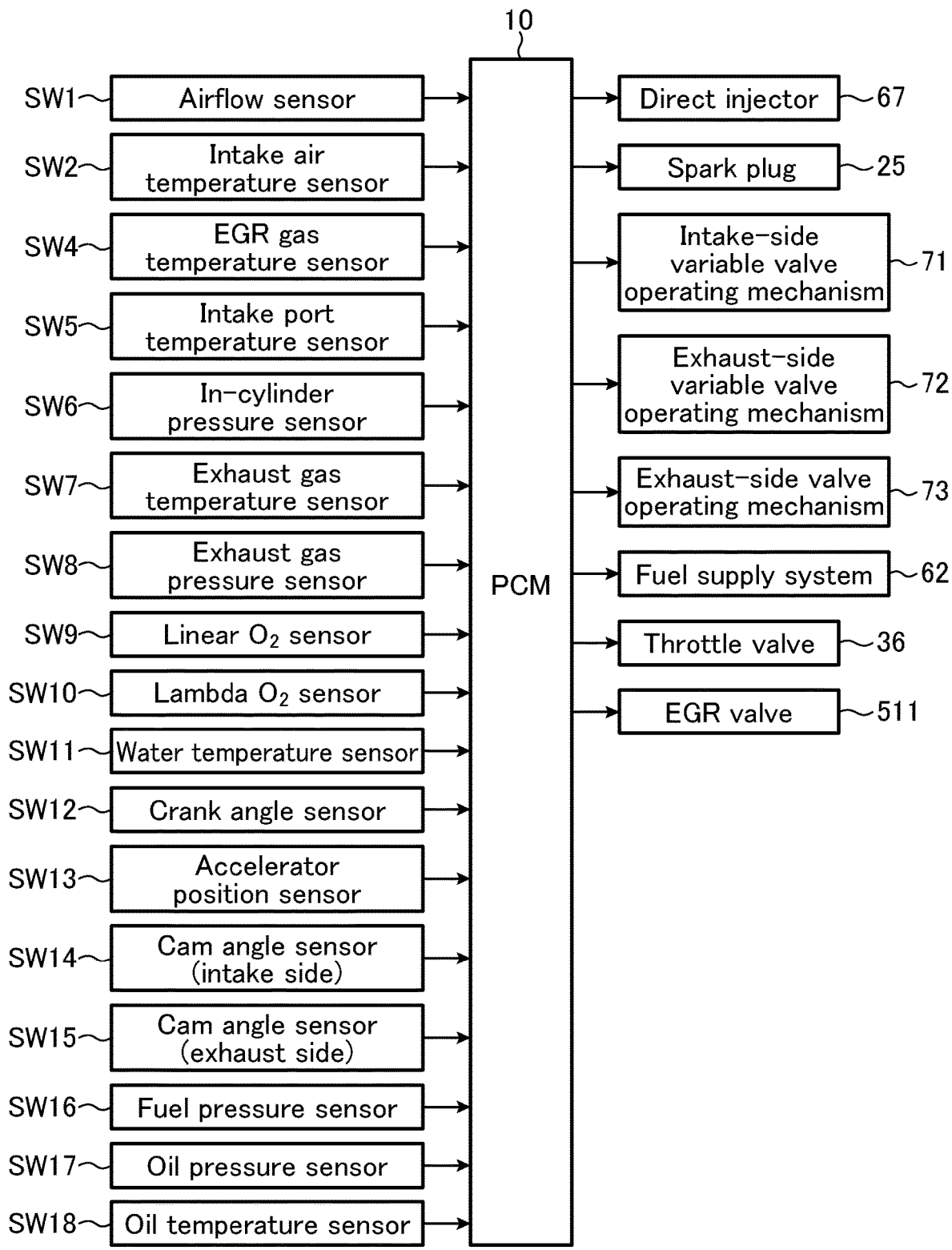
FIG. 3 is a control block diagram of the engine system according to this embodiment.

FIG. 3 is a control block diagram of the engine system according to this embodiment. As depicted in FIG. 3, the PCM 10 is configured to accept an input of detection signals of various sensors SW1, SW2, SW4 to SW18. Specifically, the PCM 10 is configured to accept an input of: a detection signal of an airflow sensor SW1 disposed downstream of the air cleaner 31 and operable to detect the flow rate of fresh air; a detection signal of an intake air temperature sensor SW2 disposed downstream of the air cleaner 31 and operable to detect the temperature of fresh air; a detection signal of an EGR gas temperature sensor SW4 disposed in the EGR passage 50 at a position adjacent to the connection with the intake passage 30 and operable to detect the temperature of external EGR gas; a detection signal of an intake port temperature sensor SW5 installed to each of the intake ports 16 and operable to detect the temperature of intake air just before flowing into each of the cylinders 18; a detection signal of an in-cylinder pressure sensor SW6 installed to the cylinder head 12 and operable to detect an internal pressure (in-cylinder pressure) of the cylinder 18; detection signals of an exhaust gas temperature sensor SW7 and an exhaust gas pressure sensor SW8 each disposed in the exhaust passage 40 at a position adjacent to the connection with the EGR passage 50 and operable to detect the temperature and pressure of exhaust gas, respectively; a detection signal of a linear $O_2$ sensor SW9 disposed upstream of the direct catalyst 41 and operable to detect the concentration of oxygen contained in exhaust gas; a detection signal of a lambda $O_2$ sensor SW10 disposed between the direct catalyst 41 and the underfoot catalyst 42 and operable to detect the concentration of oxygen in exhaust gas; a detection signal of a water temperature sensor SW11 operable to detect the temperature of engine cooling water; a detection signal of a crank angle sensor SW12 operable to detect a rotational angle of the crankshaft 15; a detection signal of an accelerator position sensor SW13 operable to detect an accelerator position corresponding to the amount of manipulation of an accelerator pedal (depiction is omitted) of a vehicle; detection signals of intake-side and exhaust-side cam angle sensors SW14, SW15; a detection signal of a fuel pressure sensor SW16 installed to the common rail 64 of the fuel supply system 62 and operable to detect the pressure of fuel to be supplied to the injector 67; a detection signal of an oil pressure sensor SW17 operable to detect the pressure of engine oil in the engine 1; and a detection signal of an oil temperature sensor SW18 operable to detect the temperature of the engine oil.

The PCM 10 is operable to perform various calculations based on the above detection signals to thereby determine states of the engine 1 and the vehicle, and output control signals, respectively, to the (direct) injector 67, the spark plug 25, the intake-side variable valve operating mechanism 71 for controlling the intake valves 21a, 21b, the exhaust-side variable valve operating mechanism 72 for controlling one 22a of the exhaust valves, the exhaust-side valve operating mechanism 73 for driving the other exhaust valve 22b, the fuel control system 62, and actuators of various valves (the throttle valve 36, the EGR valve 511, etc.). In this way, the PCM 10 controls the operation of the engine 1.

Next, functions of the engine system according to this embodiment will be described in detail.

In a normal operating range of the engine, the PCM 10 operates to perform controls of the direct injector 67, the ignition plug 25 and others, based on detection values from the various sensors, so as to achieve an engine power output requested by a driver. In the normal operating range, the cylinders 18 of the engine are operated under the same conditions so as to obtain the same power output. On the other hand, in a given operating range, i.e., when engine load is relatively low, and engine speed is relatively low, some, e.g., two, of four cylinders of the engine are deactivated to increase the power output of each of the remaining two cylinders. In this way, a total pumping loss of the engine in its entirety is reduced to realize improvement in fuel economy. With a view to preventing lowering of the internal temperature of the deactivated cylinder, for example, in an in-line four-cylinder engine, among four in-line cylinders, two cylinders located close to the middle of the in-line cylinders are deactivated. In each of the cylinders being subjected to the cylinder deactivation control, fuel injection from the direct injector 67 in the deactivated cylinder is stopped, and driving of the intake valves 21a, 21b for the intake openings 23a, 23b in the deactivated cylinder is stopped. Thus, the intake openings 23a, 23b are hermetically closed, respectively, by the intake valves 21a, 21b. On the other hand, the piston 14 and the ignition plug 25 associated with each of the cylinders which are not subjected to the cylinder deactivation control are operated in the same manner as that in a normal operating state, even during execution of the cylinder deactivation control.

Figure 4:
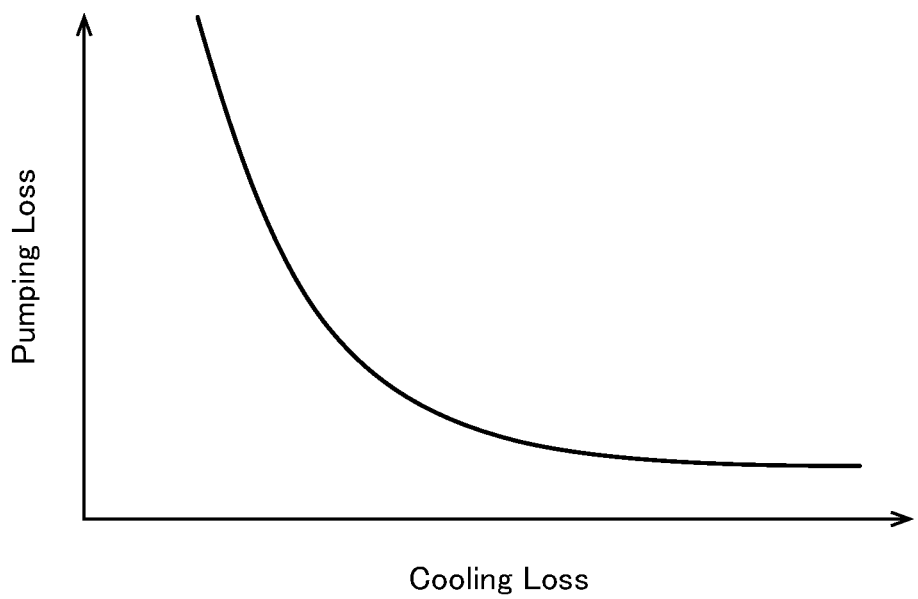
FIG. 4 is a graph depicting a relationship between pumping loss and cooling loss during cylinder deactivation.

FIG. 4 is a graph depicting a relationship between pumping loss and cooling loss, in a situation where the exhaust valve 22a is opened by the exhaust-side variable valve operating mechanism 72, when the piston in the deactivated cylinder of the engine is moved downwardly. As depicted in FIG. 4, the pumping loss and the cooling loss are in an inversely proportional relationship. Thus, if it is attempted to increase the lift amount of the exhaust valve 22a during the downward movement of the piston, to reduce the pumping loss, a large volume of gas flows from the exhaust port 17 into the combustion chamber 19, resulting in an increase in the cooling loss. On the other hand, if it is attempted to reduce the lift amount of the exhaust valve 22a to reduce the cooling loss, resistance during expansion of the combustion chamber 19 is increased, resulting in an increase in the pumping loss.

Therefore, in this embodiment, in a high engine speed rage in which the pumping loss becomes relatively large, the pumping loss is reduced on a priority basis, and, in a low engine speed rage in which the pumping loss becomes relatively small, the cooling loss is reduced on a priority basis.

Figure 5:
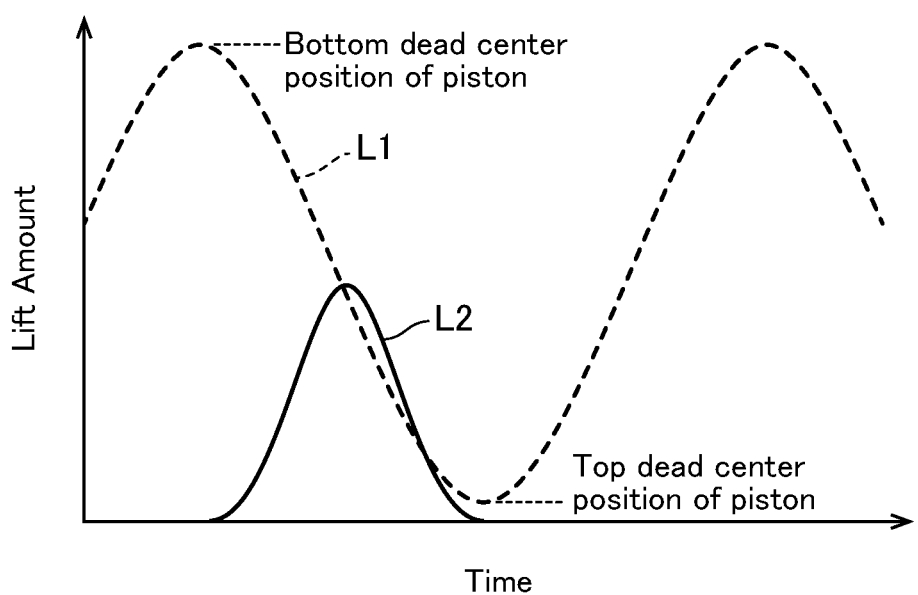
FIG. 5 is a graph depicting movement of an exhaust valve in the engine system according to this embodiment.

FIG. 5 is a graph depicting movement of the exhaust valve, in a situation where the cylinder deactivation is executed in the low engine speed range. In FIG. 5, the movement of the piston 14 is depicted as an up-down movement, for the purpose of illustration. In the graph depicted in FIG. 5, the Y axis represents the lift amount, and the X axis represents elapsed time. In FIG. 5 depicting the up-down movement of the piston 14, a bottom dead center position of the piston is plotted in a positive direction of the Y axis, and a top dead center position of the piston is plotted in a negative direction of the Y axis.

In FIG. 5, the dashed line L1 indicates the movement of the piston 14, and the sold line L2 indicates movement of the exhaust valve 22b driven by the exhaust-side valve operating mechanism 73. As depicted in FIG. 5, when the cylinder deactivation control is executed in the low engine speed range, the exhaust valve 22b driven by the exhaust-side valve operating mechanism 73 is opened when the piston is moved upwardly from the bottom dead center position to the top dead center position. On the other hand, the exhaust valve 22a controlled by the exhaust-side variable valve operating mechanism 72 is maintained in a closed state, during a period during which the piston 14 is moved upwardly from the bottom dead center position to the top dead center position, and during a period during which the piston 14 is moved downwardly from the top dead center position to the bottom dead center position. Thus, high-temperature combusted gas in the combustion chamber 19 is allowed to stay in the combustion chamber 19 without being discharged to the exhaust port 17. Therefore, the internal temperature of the combustion chamber 19 can be maintained at a high value. Then, assume that a driver depresses the accelerator pedal in the above state. In this case, even when the cylinder deactivation control is terminated due to an increase in engine load, it is possible to quickly realize a torque requested by the driver, because the combustion chamber 19 in each of the cylinders subjected to the cylinder deactivation control is maintained at a high temperature.

Figure 6:
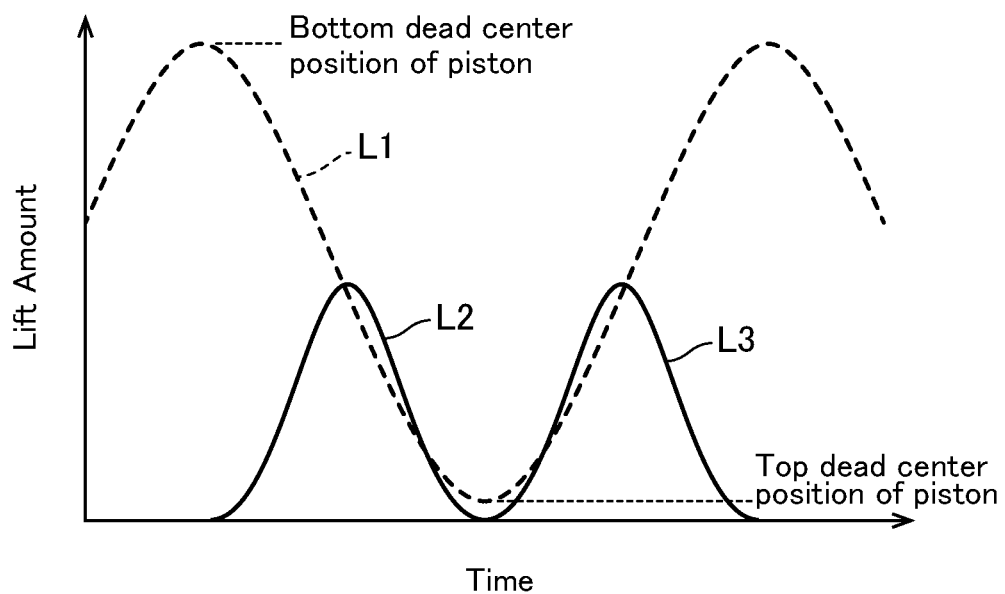
FIG. 6 is a graph depicting the movement of the exhaust valve in the engine system according to this embodiment.

FIG. 6 is a graph depicting the movement of the exhaust valve, in a situation where the cylinder deactivation is executed in the high engine speed range.

In FIG. 6, the dashed line L1 indicates the movement of the piston 14, as with FIG. 5, and the sold line L2 and the solid line L3 indicate, respectively, movement of the exhaust valve 22b driven by the exhaust-side valve operating mechanism 73, and movement of the exhaust valve 22a controlled by the exhaust-side variable valve operating mechanism 72. As depicted in FIG. 6, when the cylinder deactivation control is executed in the high engine speed range, the exhaust valve 22b driven by the exhaust-side valve operating mechanism 73 is opened when the piston is moved upwardly from the bottom dead center position to the top dead center position. On the other hand, the exhaust valve 22a controlled by the exhaust-side variable valve operating mechanism 72 is closed during the period during which the piston 14 is moved upwardly from the bottom dead center position to the top dead center position, but is opened during the period during which the piston 14 is moved downwardly from the top dead center position to the bottom dead center position. As above, the exhaust valve 22a is opened during the downward movement of the piston 14, so that gas in the exhaust port 17 is introduced into the exhaust port 17. During the cylinder deactivation, the intake-side variable valve operating mechanism 71 is deactivated, and therefore the intake openings 23a, 23b are hermetically closed, respectively, by the intake valves 21a, 21b, as mentioned above. Further, when the piston 14 is moved downwardly during the cylinder deactivation, the exhaust valve 22b driven by the exhaust-side valve operating mechanism 73 is also closed. Thus, at this timing, the exhaust valve 22a is opened by the exhaust-side variable valve operating mechanism 72, so that, during the downward movement of the piston 14, i.e., during expansion of the combustion chamber 19, gas in the exhaust port 17 can be introduced into the combustion chamber 17 being expanding. This makes it possible to reduce resistance during expansion of the combustion chamber 19, as compared to the case where both of the exhaust valves 22a, 22b are closed. Further, gas to be introduced into the combustion chamber 19 in the state in which the exhaust valve 22a is opened during the downward movement of the piston 14 contains combusted gas in the normal operating range, wherein the temperature of the combusted gas is higher than that of outside air. Thus, by opening the exhaust valve 22a during the downward movement of the piston 14 to re-introduce gas in the exhaust port 17 into the combustion chamber 19, it becomes possible to suppress lowering of the internal temperature of the combustion chamber 19. In this way, the internal temperature of the combustion chamber 19 is maintained, so that it becomes possible to enhance efficiency of combustion in the cylinder when it is re-activated from the deactivated state. Further, even when the pumping loss in the deactivated two cylinders located close to the middle of the four in-line cylinders is reduced in the high engine speed range on a priority basis, it is possible to suppress lowering of the temperature in the deactivated cylinders, because the temperature of the remaining two cylinders located at opposite ends of the in-line cylinders is gradually raised along with an increase in engine speed.

Figure 7:
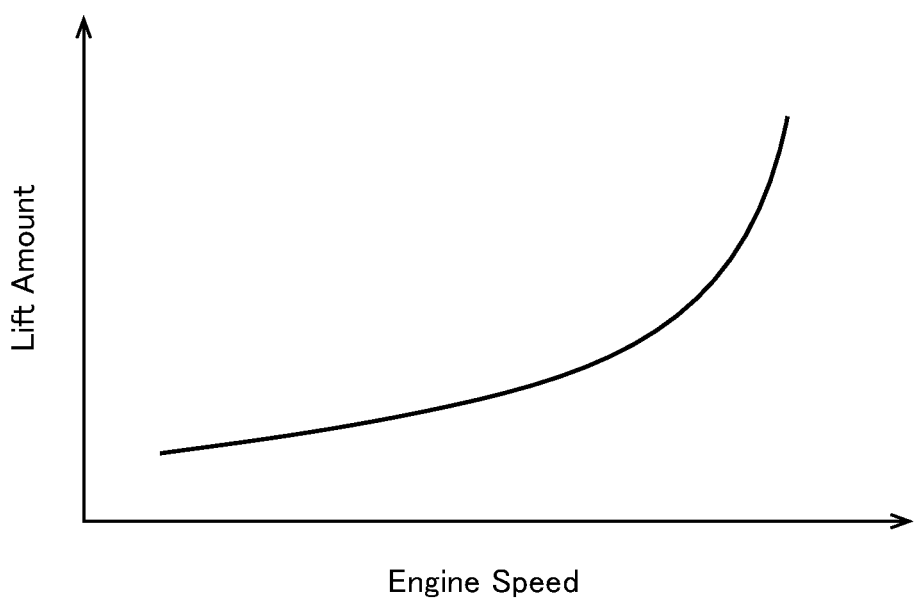
FIG. 7 is a graph depicting a relationship between engine speed, and lift amount of the exhaust valve in the engine system according to this embodiment.

FIG. 7 is a graph depicting a relationship between the lift amount of the exhaust valve and the engine speed. As depicted in FIG. 7, the lift amount of the exhaust valve 22a during the cylinder deactivation is preferably determined according to the engine speed. More specifically, the lift amount of the exhaust valve 22a during the cylinder deactivation is gradually increased along with an increase in engine speed. When the exhaust valve 22a is opened during the cylinder deactivation, a larger volume of gas is introduced into the cylinder 19 as the lift amount of the exhaust valve 22a is increased, so that the cooling loss caused by lowering of the internal temperature of the combustion chamber 19 is increased, whereas the pumping loss is reduced. Therefore, when the engine speed is not high, it is preferable to restrict the lift amount of the exhaust valve 22a to some extent so as to reduce the cooling loss while reducing the pumping less. On the other hand, when the engine speed becomes high, the pumping loss is sharply increased. Thus, in this embodiment, the lift amount of the exhaust valve 22a is increased along with an increase in engine speed. This makes it possible to reliably reduce the pumping loss of the engine even in the high engine speed range.

As above, in this embodiment, during a period during which the cylinder deactivation is executed in a low engine load and low engine speed operating range, the exhaust valve 22a can be opened during the downward movement of the piston 14 by using the exhaust-side variable valve operating mechanism 72. Thus, even in the situation where the intake valves 21a, 21b and the exhaust valve 22b driven by the exhaust-side valve operating mechanism 73 are closed during the downward movement of the piston 14, the exhaust valve 22a can be opened to communicate the combustion chamber 19 with the exhaust port 17. In this way, the combustion chamber 19 and the exhaust port 17 are communicated with each other during the downward movement of the piston 14, so that it is possible to suppress reduction in the internal pressure of the combustion chamber 19 during the downward movement of the piston 14. This makes it possible to suppress the pumping loss during the cylinder deactivation.

LIST OF REFERENCE SIGNS 1 engine
10 PCM
18 cylinder
21 intake valve
22 exhaust valve
71 intake-side variable valve operating mechanism
72 exhaust-side variable valve operating mechanism
73 exhaust-side valve operating mechanism

The invention claimed is:

1. A controller for a multi-cylinder engine, comprising:
a plurality of intake ports;
a plurality of intake valves each provided correspondingly to a respective one of the plurality of intake ports;
a plurality of exhaust ports;
a plurality of exhaust valves each provided correspondingly to a respective one of the plurality of exhaust ports;
a combustion chamber to which the plurality of intake ports and the plurality of exhaust ports are connected;
an intake-side variable valve operating mechanism operable to adjust a lift timing of each of the plurality of intake valves provided, respectively, in the plurality of intake ports;
an exhaust-side variable valve operating mechanism operable to adjust a lift timing of at least one of the plurality of the exhaust valves provided, respectively, in the plurality of exhaust ports; and
an exhaust-side valve operating mechanism operable to drive, at a fixed timing, the remaining one or more of the plurality of the exhaust valves provided, respectively, in the plurality of exhaust ports,
wherein, when a cylinder deactivation of at least one specific cylinder in the multi-cylinder engine is executed in a given operating range, the controller is operable to stop a fuel injection in the cylinder, and to prohibit a lift of the intake valve in the cylinder by controlling the intake-side variable valve operating mechanism, and to open an exhaust valve from among the plurality of exhaust valves in the cylinder by controlling the exhaust-side variable valve operating mechanism, during a downward movement of a piston in the cylinder.

2. The controller according to claim 1, wherein, even when the cylinder deactivation of the at least one specific cylinder is executed, the controller is operable, in a given low engine speed range, to maintain a closed state of the exhaust valve in the cylinder during a downward movement of a piston in the cylinder.

3. The controller according to claim 1, wherein a lift amount of the exhaust valve during the cylinder deactivation is gradually increased along with an increase in an engine speed.

4. The controller according to claim 1, wherein a lift amount of the exhaust valve during the cylinder deactivation is gradually reduced along with a decrease in an engine speed.

5. The controller according to claim 1, wherein the multi-cylinder engine has a plurality of cylinders arranged in series, and wherein the cylinder deactivation is executed for at least one cylinder located close to a middle of the plurality of cylinders arranged in series.

6. The controller according to claim 1, wherein, when the cylinder deactivation of the at least one specific cylinder is executed, a valve opening timing of the exhaust valve in the cylinder during an intake stroke is set in a first half of the intake stroke.

* * * * *